(No Model.)
L. WARTENBERG.
ADJUSTABLE COUPLING FOR HARNESS.
No. 278,474. Patented May 29, 1883.
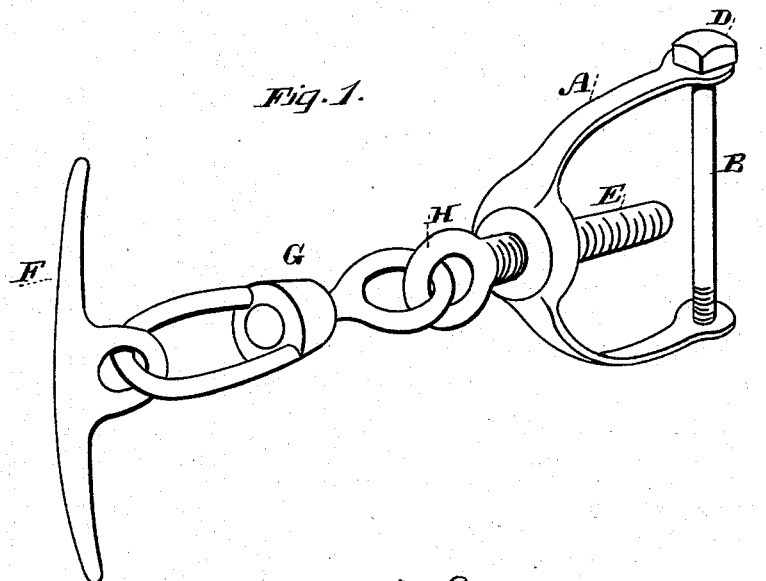
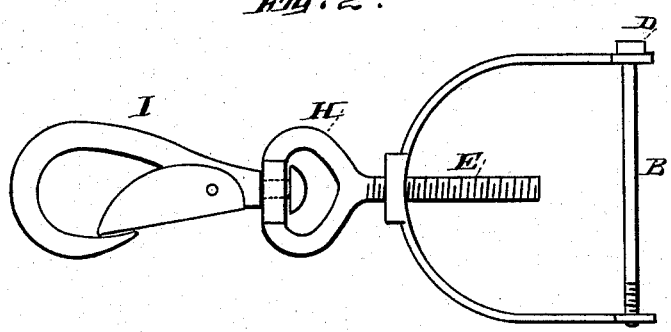
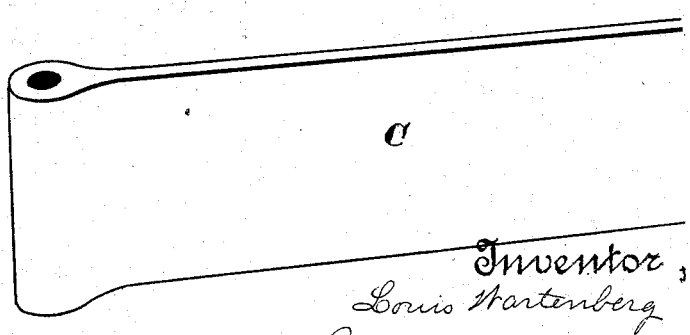
Witnesses,
Geo. H. Strong.
J. H. Krouse
Inventor,
Louis Wartenberg
By Dewey & Co.
Attorneys

UNITED STATES PATENT OFFICE.

LOUIS WARTENBERG, OF ANAHEIM, CALIFORNIA.

ADJUSTABLE COUPLING FOR HARNESS.

SPECIFICATION forming part of Letters Patent No. 278,474, dated May 29, 1883.

Application filed October 21, 1882. (No model.)

*To all whom it may concern:*

Be it known that I, LOUIS WARTENBERG, of Anaheim, county of Los Angeles, State of California, have invented an Improved Adjustable Coupling for Harness; and I hereby declare the following to be a full, clear, and exact description thereof.

My invention relates to an adjusting-coupling for harness, which is especially adapted for the links or connections by which the tug is attached to the whiffletree.

It consists of a screw turning in a nut in the link to which the end of the tug is secured, said screw having a swivel connected with its opposite end, to which the coupling hook or bar is connected, as will be more fully explained by reference to the accompanying drawings, in which—

Figure 1 is a view of my device with swivel and coupling-hook. Fig. 2 is a modification. Fig. 3 is a view of the trace.

Horses are often injured about the shoulders by the unequal bearing caused by the different lengths of the tugs or other inequalities in the harness, which throw more strain upon one side than the other. My invention is designed to obviate this by providing means for the ready adjustment of the lengths of the two sides.

A is a semicircular or D-shaped iron having a bolt or rod, B, passing through the ends, as shown. The tug or trace C is folded over and riveted, stitched, or otherwise secured, so as to form a loop through which the bolt passes and holds it in place. The bolt has a screw-thread cut upon one end, and a corresponding thread is formed in the side of the loop, into which the bolt screws, instead of being riveted in the usual manner. The bolt has a square head, D, upon the opposite end, so that a wrench may be applied at any time to introduce or remove it. The center of the curved loop A is made thick enough to have a hole made in it and a screw cut to receive the screw-bolt E, which is as long as the space between the curve and the tug attachment will admit.

When a bar, F, is employed to connect the tug with the whiffletree by passing through a ring upon the end of the latter, as shown in Fig. 1, a swivel, G, has one part connected with the eye H on the head of the screw E, and the other part with the bar, so that a loose joint is formed, which will allow the parts to turn upon each other without turning the screw. When a hook of any form is used (as at I, Fig. 2) the eye H has its outer portion flattened and perforated, and the end of the hook-shank passes through this hole, and has a head formed upon it, so that the hook itself swivels or turns without moving the screw. This screw E fits tightly in its nut in the curved link or loop, and cannot be turned without considerable effort. It will therefore remain wherever it is placed, and it thus serves to regulate the length of the tugs, so that if one becomes elongated, or the pull is in any way uneven, the screws may be turned without detaching the tug, and the lengths may be changed to suit with but little trouble.

Having thus described my invention, what I claim as new, and desire to secure by Letters Patent, is—

In a trace-coupling, the curved link or tug end A, having a nut formed in the center of the curve, in combination with the screw E, with the eye H, and the swivel with the hook or bar, substantially as herein described.

In witness whereof I hereunto set my hand.

LOUIS WARTENBERG.

Witnesses:
S. H. NOURSE,
G. W. EMERSON.